US006341101B1

(12) United States Patent
Dutton et al.

(10) Patent No.: US 6,341,101 B1
(45) Date of Patent: Jan. 22, 2002

(54) LAUNCHABLE COUNTERMEASURE DEVICE AND METHOD

(75) Inventors: C. Ray Dutton, New Bedford, MA (US); Lynn A. Potter, North Kingstown, RI (US); Joseph B. Lopes, Seekonk, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/536,490

(22) Filed: Mar. 27, 2000

(51) Int. Cl.$^7$ .................................................. H04K 3/00
(52) U.S. Cl. ......................................................... 367/1
(58) Field of Search .............................. 367/1; 381/71.1

(56) References Cited

U.S. PATENT DOCUMENTS

| | | | | |
|---|---|---|---|---|
| 4,025,724 A | * | 5/1977 | Davidson, Jr. et al. | 367/1 |
| 4,184,209 A | * | 1/1980 | Crist | 367/1 |
| 4,255,797 A | * | 3/1981 | Stocklin | 367/1 |
| 4,438,526 A | * | 3/1984 | Thomalia | 381/73.1 |
| 4,473,906 A | * | 9/1984 | Warnaka et al. | 367/1 |
| 5,033,028 A | * | 7/1991 | Browning | 367/1 |
| 5,117,401 A | * | 5/1992 | Feintuch | 367/135 |
| 5,341,343 A | * | 8/1994 | Aske | 367/1 |
| 5,394,376 A | * | 2/1995 | Riddle et al. | 367/1 |

* cited by examiner

*Primary Examiner*—Ian J. Lobo
(74) *Attorney, Agent, or Firm*—Michael J. McGowan; James M. Kasischke; Prithvi C. Lall

(57) ABSTRACT

A launchable countermeasure device and method is disclosed that may be selectively operated to produce one or more of a plurality of countermeasure techniques. The device is compatible with presently existing launch control panels that are connected to an external connection that extends from the watertight hull. Although the signal formats of the launch control panel are different from those of an RS232 or RS422 connection used with a personal computer, nonetheless an interface is operable to accept any of these signal formats. The interface also includes a switch to direct communication from the personal computer to a RS232 port of an internally mounted countermeasure processor. Information downloaded by the personal computer can be used to effect or upgrade different countermeasure techniques such as sonar or incoming torpedo threat countermeasure techniques. The launch control panel is used to select the type of countermeasure technique to be used along with the information relating thereto such as acoustic signal production, hovering system constraints, duration, depth, propeller controls, and the like. The various subsystems are linked by a bus and controlled by the countermeasure processor through a bus controller.

20 Claims, 3 Drawing Sheets

LAUNCHABLE COUNTERMEASURE DEVICE AND METHOD

STATEMENT OF THE GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to acoustic countermeasure devices such as incoming torpedo and sonar countermeasure systems and, more specifically, to apparatus and method for a launchable countermeasure device with the capability to store, select, program, and rapidly deploy any one or a combination of a variety of countermeasure devices.

(2) Description of the Prior Art

While acoustic countermeasure devices have a small cost in comparison to the cost of the submarines, ships and other vessels they protect, nonetheless it would be desirable to further reduce the costs associated with such systems if the overall effectiveness could be maintained and preferably significantly increased. The submarine fleet currently uses at least two separate countermeasure devices in the external six-inch countermeasure launchers including one against sonar systems and one against incoming threat torpedoes. Due to their sealed construction, communication interface is limited so that stored tactical information tends to be difficult to change. For the same reason, testing and maintenance tends to be difficult and time consuming. As acoustic masking systems involve highly specialized tasks as suggested by the following prior art patents, dedicated components, logistics, and software are used in prior art devices. Modifications and upgrades therefore require significant time and cost. The present design uses only a single cable connection that is preferably provided for receiving launch control panel signals prior to deployment in accordance with specifications of the existing CSA MK2 Launcher system. The signals used by the CSA MK2 Launcher system are different from those used by a standard PC such as RS232 and RS422 signal formats. The CSA MK2 Launcher system is not designed to download operational code or provide signal generation updates such as might be tailored to specific threats as would be desirable for installation dockside rather than at the factory. Several of the following patents disclose prior art efforts to provide countermeasure systems for protecting ships and submarines.

U.S. Pat. No. 4,255,797, issued Mar. 10, 1981, to P. L. Stocklin, discloses a sonic attenuation system for directing a beam of sound of sufficient amplitude for inducing a finite amplitude effect in water for interaction with a field of sound to produce intermodulation products. Energy is removed from the sound field in the formation of the intermodulation products resulting in an attenuation of sound in the sound field.

U.S. Pat. No. 5,341,343, issued Aug. 23, 1994, to R. L. Aske, discloses an explosive actuated acoustic device that emits sound to be used in torpedo countermeasures. Numbered devices are delivered over an extended area and sink through the water. The devices are actuated at different times as they sink, to provide sound masking over an extended period of time. The devices also include safety devices which prevents premature actuation from jarring or jolting and from impact with the water.

U.S. Pat. No. 4,184,209, issued Jan. 15, 1980, to R. P. Christ, discloses a towed decoy system adapted to be towed from a towing vessel, an electrically powered noisemaker, an electrical tow cable attached to the noisemaker, a depressor vane, a depressor cable connected to the depressor vane and to the towing vessel, and means interconnecting the depressor cable and the electrical tow cable at a point near the depressor vane. The interconnecting means comprises a pair of cable grips respectively attached at one end to adjacent sections of the electrical tow cable and at the other end to a snatch block movably mounted on the depressor cable thereby providing slack in the electrical tow cable whereby the noisemaker is towed at a depth not less than that of the point of attachment of the snatch block to the depressor cable.

U.S. Pat. No. 4,438,526, issued Mar. 20, 1984, to R. O. Thomalla, discloses a sound masking system for generating background sound. The background sound is automatically adjusted to ambient noise level by adjusting the amplitude of the frequency levels detected.

U.S. Pat. No. 4,473,906, issued Sep. 25, 1984, to Warnaka et al., discloses an active attenuator for the attenuation of a relatively broad band of lower frequency vibration such as sound waves from a given source, by the introduction of canceling vibration having the mirror image amplitude and phase characteristics of the source vibration.

U.S. Pat. No. 5,033,028, issued Jul. 16, 1991, to D. R. Browning, discloses apparatus for overcoming stroke limitations of moving coil reaction-mass vibration dampers by recovering armature stroke displacement. The coil housing is selectively coupled or de-coupled to the vibrating structure. If, when the armature reaches its travel limit, sufficient damping energy has not been applied to the structure, the coil-housing assembly is decoupled from the structure while the armature is pulsed back to its zero displacement position. The housing is then re-coupled to the surface having displaced some distance from its previous location. The process continues until the needed additional damping force is generated.

U.S. Pat. No. 5,117,401, issued May 26, 1992, to P. L. Feintuch, discloses an active adaptive noise cancelling device that inserts delays in the weight update logic of an adaptive filter employed by the canceller to make the filter stable. It has been found that there is a great deal of flexibility regarding the selection of the delay values. This insensitivity permits designing the delays in advance, and not having to adjust them to different situations as they change, thus no longer requiring a training mode. The canceller dramatically reduces the amount of hardware needed to perform active adaptive noise canceling, and eliminates the need for the training mode, which in some applications, including automobiles, for example, can be as objectionable as the noise sources that are to be suppressed.

U.S. Pat. No. 5,394,376, issued Feb. 28, 1995, to Riddle et al., discloses an apparatus for reducing acoustic radiation from an enclosure containing a fluid that includes one or more vibration sensors in communication with surfaces of the enclosure. A control unit uses a reference signal and a summation signal to calculate a cancellation waveform to offset the cause of the detected vibration.

U.S. Pat. No. 4,025,724, issued May 24, 1977, to Davidson, Jr. et al., discloses an array of independent sound cancellation units arranged over a vibrating noise generating surface. Each unit includes an arrangement of acoustic transducers (sensors) positioned adjacent to the surface to obtain an electrical average of the local acoustic noise generated by a predetermined zone of the surface. A projected output signal detected by the sensors is used as a feedback signal along with appropriate time delays to cancel the effect of the projected output signal, and to cancel the effect of the output of other projectors of the array.

In summary, while the prior art shows various acoustic systems and acoustic countermeasure means, the above disclosed prior art does not show a launchable countermeasure device with the capability to store, select, program and rapidly deploy any one or a combination of a variety of countermeasure techniques and devices. The prior art does not disclose a launchable countermeasure device with capability of computer communications apart from those of a launch control panel and which allows for a variety of functions for factory preset loading, built in testing, downloading of operational code including tactical operational parameters, signal generation updates, greatly reduced hardware requirements and costs, reduced control system size, and less cost to produce than the combined costs of prior art sonar and incoming threat countermeasure systems.

Consequently, there remains a need for a system that allows for greatly increased operational flexibility, improved testing ability, reduced maintenance costs and time, and reduced manufacturing costs and time. Those skilled in the art will appreciate the present invention that addresses the above and other problems.

SUMMARY OF THE INVENTION

Accordingly, it is an object of the present invention to provide an improved launchable acoustic countermeasure device, method, and system.

It is another object of the present invention to provide a launchable acoustic countermeasure device that can be rapidly deployed to effect a plurality of different countermeasure techniques.

It is yet another object of the present invention to provide a launchable acoustic countermeasure device that can communicate with either a launch control panel for effecting launch and prelaunch commands as well as with a personal computer external to the hull for downloading data, testing, and upgrading.

It is yet another object of the present invention to provide a system interface for increased external hull communication capability and corresponding increased communications within the hull of the sealed countermeasure device.

These and other objects, features, and advantages of the present invention will become apparent from the drawings, the descriptions given herein, and the appended claims.

In accordance with the present invention, a method for effecting a plurality of countermeasure techniques using a launchable countermeasure device is provided that comprises steps such as connecting an external computer to the launchable countermeasure device through an external connector outside of a hull of the launchable countermeasure device. The external computer communicates with an internal countermeasure processor mounted within the hull of the launchable countermeasure device to thereby transfer from the external computer data related to each of the plurality of countermeasure techniques into a memory of the internal countermeasure processing system. The external computer is disconnected from the external connector and a launch control panel (LCP) is connected to the external connector. The launch control panel can be used to select one or more of the plurality of countermeasure techniques and the launchable countermeasure device is deployed to effect the selected one or more countermeasure techniques underwater. For this purpose and/or to effect updates of tactical data, the external computer is connected to the launchable countermeasure device through the external connector outside of a hull of the launchable countermeasure device. An interface is operable for communicating with the internal countermeasure processor selectively through either a system bus or through a standard communications protocol connection depending on whether the launch control panel or the external computer is connected to the external connector.

A field programmable gate array is preferably used in the interface to determine whether the launch control panel or the external computer is connected to the external connector. Preset information may be stored on an interface. The field programmable gate array on the interface is also preferably used for detecting if arming of the launchable countermeasure device has occurred. A commercial bus interface is preferably used for communicating between the internal countermeasure processor and a hovering system and a signal generator system within the launchable countermeasure device.

The launchable acoustic countermeasure device is therefore operable for deployment by a launch control panel and for dockside programming by an external computer. The launch control panel and the external computer produce a respective launch control panel signal and an external computer signal, each having a different signal format.

The launchable acoustic countermeasure device includes a watertight hull with a data bus mounted within the watertight hull. A signal generator is connected to the data bus for producing countermeasure acoustic signals through a transducer. A hovering subsystem is connected to the data bus for controlling water depth and movement of the countermeasure device. The bus controller communicates with the signal generator and the hovering subsystem through the data bus. The internal countermeasure processing system is operable for producing a signal for the signal generator and the hovering subsystem through the bus controller. The field programmable gate array operates to provide status and control signals when the detection circuitry determines the launch control panel is connected to the external connector. The interface operates to transfer external computer signals to the internal countermeasure processor when the detection circuitry determines the external connector is connected to the external computer.

An electronics module physically supports the bus controller, the internal countermeasure processor, and the interface. The electronics module includes an electronics module bus for electrically connecting the bus controller, the internal countermeasure processor, and the interface. An analog switch in the interface is used for transferring the external computer signals to the communications connection of the internal processor. Non-volatile memory for preset storage is provided on the interface. Isolation and signal conversion circuitry on the interface is operable for accepting one or more computer signal formats from the external computer and a different signal format from the launch control panel.

Thus, in operation, the launchable countermeasure device selectively operates in a PC mode for communicating with an internal countermeasure processing system to install or change operational code data in the memory. For this purpose, the launchable countermeasure device is operable for receiving data in RS232/RS422 or other standard communications protocol signal format when in the PC mode. Alternatively, the launchable countermeasure device operates in a launch control panel mode for activating the internal countermeasure processing system to effect one or more of the plurality of countermeasure techniques. The one or more countermeasure techniques include sonar countermeasure techniques and incoming threat countermeasure techniques.

The launchable countermeasure device of the present invention is designed to replace present processing systems for sonar countermeasure systems and incoming torpedo countermeasure systems. The present invention performs all processing functions and operational requirements of both of these systems in a less costly and more flexible manner. Only one production line is now required. Many of the components of the system are commercially available thereby reducing costs. The system can be upgraded largely by software changes rather than hardware changes, which require opening the hull sections of the countermeasure device. By use of the present invention, factory or dockside programming capabilities are available to update threat tailored responses, program executable code, and the new signal generation requirements as they become available. At the same time, the launch control panel can still communicate with the launchable countermeasure device using the original signal structure and protocol of the CSA MK 2 LCP for loading presets, obtaining current status and commanding the launch. Only one logistics path is required and the new system is less bulky than either of the electronics assemblies that have been replaced thereby.

BRIEF DESCRIPTION OF THE DRAWINGS

A more complete understanding of the invention and many of the attendant advantages thereto will be readily appreciated as ma the same becomes better understood by reference to the following detailed description when considered in conjunction with the accompanying drawings wherein corresponding reference characters indicate corresponding parts throughout the several views of the drawings and wherein.

BRIEF DESCRIPTION OF THE PREFERRED EMBODIMENTS

Figure 1:
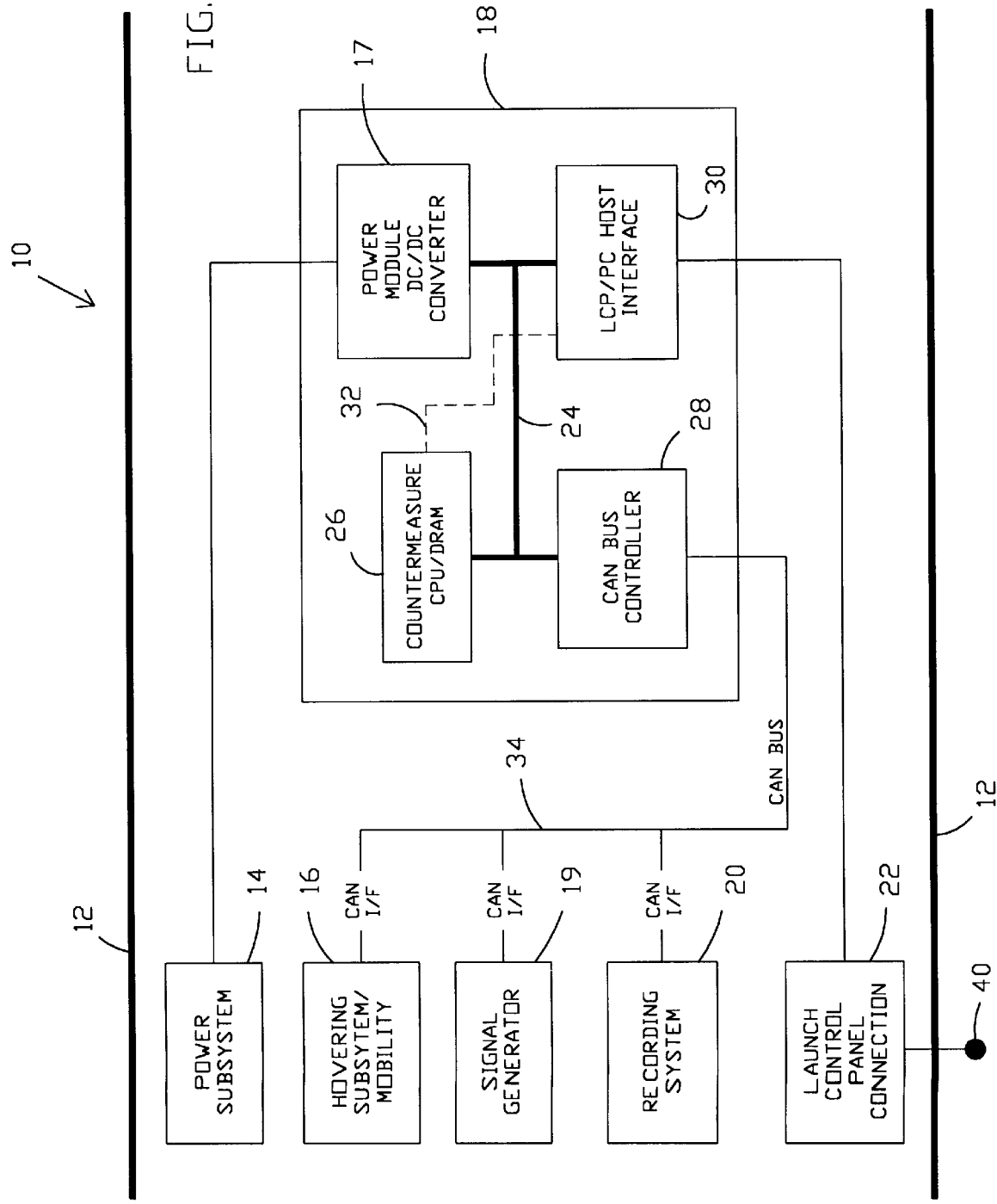
FIG. 1 is a block diagram of a launchable countermeasure device in accord with the present invention.

Referring now to the drawings and, more particularly, to FIG. 1 there is shown a block diagram of a launchable countermeasure device 10 in accord with the present invention. Watertight hull 12 contains the various systems needed for operation and acts to support the system components in an underwater environment. Power subsystem 14 provides battery power for operation of the system after launch. Power module 17 is a dc—dc converter used to provide the correct voltages and power to electronics module 18 that is discussed subsequently. Hovering subsystem/mobility components 16 are used to position device 10 at the appropriate depth and position depending on the type of countermeasure to be activated. Hovering subsystem 16 includes components for this purpose typically including such items as propellers, ballast chambers, and the like. Signal generator 19 is used to produce the appropriate acoustic signal for implementing the desired countermeasure technique. Signal generator 19 may include transducers for appropriate sending and receiving of signals as necessary. Recording system 20 may be used to record desired information for later diagnosis. Launch control panel connection 22 includes an opening in watertight hull 12 for a cable connection as discussed subsequently. Control area network (CAN) bus 34 is used for communication between the various modules. In a preferred embodiment, CAN bus 34 is a commercially available bus that provides for modularity and flexibility of components that are used. Because it is commercially available, design costs are eliminated. Moreover a rugged, severe environment bus is preferably selected. Numerous vendors are available that provide large production volumes so that costs for the bus are kept low. The presently preferred CAN bus 34 includes a minimum two-wire serial data bus that can transfer up to one megabit per second for lengths less than forty meters. Up to eight data bytes may be used per transfer. Error detection and control capabilities are built into the I/F chips used for interconnection thereto for the various components. Each node or connection has a unique identifier and arbitration. When sending a message, each subsystem, e.g., hovering subsystem 16, is addressed using a unique subsystem identifier. Preferably each subsystem transmits a message using a unique message identifier such that the subsystem identifier and message identifier make up an 11 bit identifier. Because each message not only indicates the receiver of the message but also the sender, each subsystem can be set up with its own acceptance codes to filter and appropriately operate on messages that are received. The Data Length Code (DLC) and the Remote Transmission Request (RTR) bits are preferably consistent with Standard CAN (Version 2.0A) message formats. The DLC field, is a 4-bit field that indicates the number of bytes in the Data field that follows. The RTR is a single bit field where a dominant (logic 0) value indicates that the message is a Data Frame, and a recessive (logic 1) value indicates that the message is a Remote Frame. For this application, the RTR bit shall always be set to logic 0. CAN bus controller 28 controls communications from electronics module 18 to the various subsystems. CAN bus controller 28 is a commercially available device that can be purchased at competitive prices and which is available in suitable quantities and within severe operation reliability specifications.

Electronics module 18 provides a physical support and common bus 24 for the components thereof that at the present time preferably include countermeasure processor and dram memory 26, control area network (CAN) bus controller 28, and LCP/PC host interface 30. An RS232 interconnection bus 32 is preferably provided for communication between interface 30 and countermeasure processor 26 for reasons discussed subsequently. Countermeasure processor 26 is preferably a commercially available computer such as an Intel 486 CPU running at 100 MHz. Electronics module 18 may preferably include round support braces (not shown) with appropriate struts therebetween to form a unit that fits securely within the round hull for supporting the components that are preferably on separate cards. Such supports are commercially available in dimensions well suited for six-inch hull construction at a low cost. Such modules may be selected from numerous vendors at low cost and may operate at extended temperatures in severe environments. Bus 24 preferably incorporates the same bus structure as Personal Computer (PC) Industry Standard Architecture (ISA), but uses two stack through connectors. This allows boards to be stacked upon each other and provides the same functionality as placing cards in the PC bus slots. Therefore, each card must have a unique address to allow countermeasure processor 26 to send and receive data. A base address is used to select the card and consecutive addresses are used to access additional registers. The number of these consecutive addresses must be defined to allow access to all functions on the card. For example, referring also to FIG. 2 that discloses a more detailed block diagram of LCP/PC Host interface 30, internally mounted countermeasure processor 26 may use bus 24 to access information from LCP/PC Host interface 30 and more specifically address decode block 34. Address decode block 34 operates to specify and decode an address space on bus 24 to allow communications with countermeasure processor 26. For LCP/PC Host interface 30 only four addresses are presently 42 required including three addresses to access countermeasure memory for preset storage 36 and one address to access a status register that includes the status byte 38. Non-volatile memory is required for memory for preset storage 36 and status byte 38 in order to hold the contents after power down. In the present embodiment, only eight bytes or sixty-four bits are needed for the preset data.

LCP/PC Host interface 30 is used to allow communications with launchable countermeasure device 10 by means of existing mechanical interface connector 40 using either a launch control panel as has been typical in the past or alternatively connecting to existing mechanical interface 40 using a personal computer that is, of course, externally located with respect to hull 12. LCP/PC interface 30 therefore permits two significant functions of countermeasure device 10. The first function is to interface with the existing CSA MK2 Launcher System which provides submarines with the capability to store, select, program and rapidly deploy any one or a combination of a variety of countermeasure devices using different countermeasure techniques. The second function provides the added capability of computer communications using existing physical connector/cable 40 that allows a variety of functions for factory preset loading, built in test, downloading of operational code, and signal generation updates. In addition, LCP/PC Host interface 30 preferably includes field programmable array (FPGA) 42 to allow for additional programmability for future updates of countermeasure functions and compatibility with design changes of the current launcher system. Other types of components such as in-system programmable (ISP) components and complex programmable logic devices (CPLD) may be included to increase the flexibility of the present design.

Figure 2:
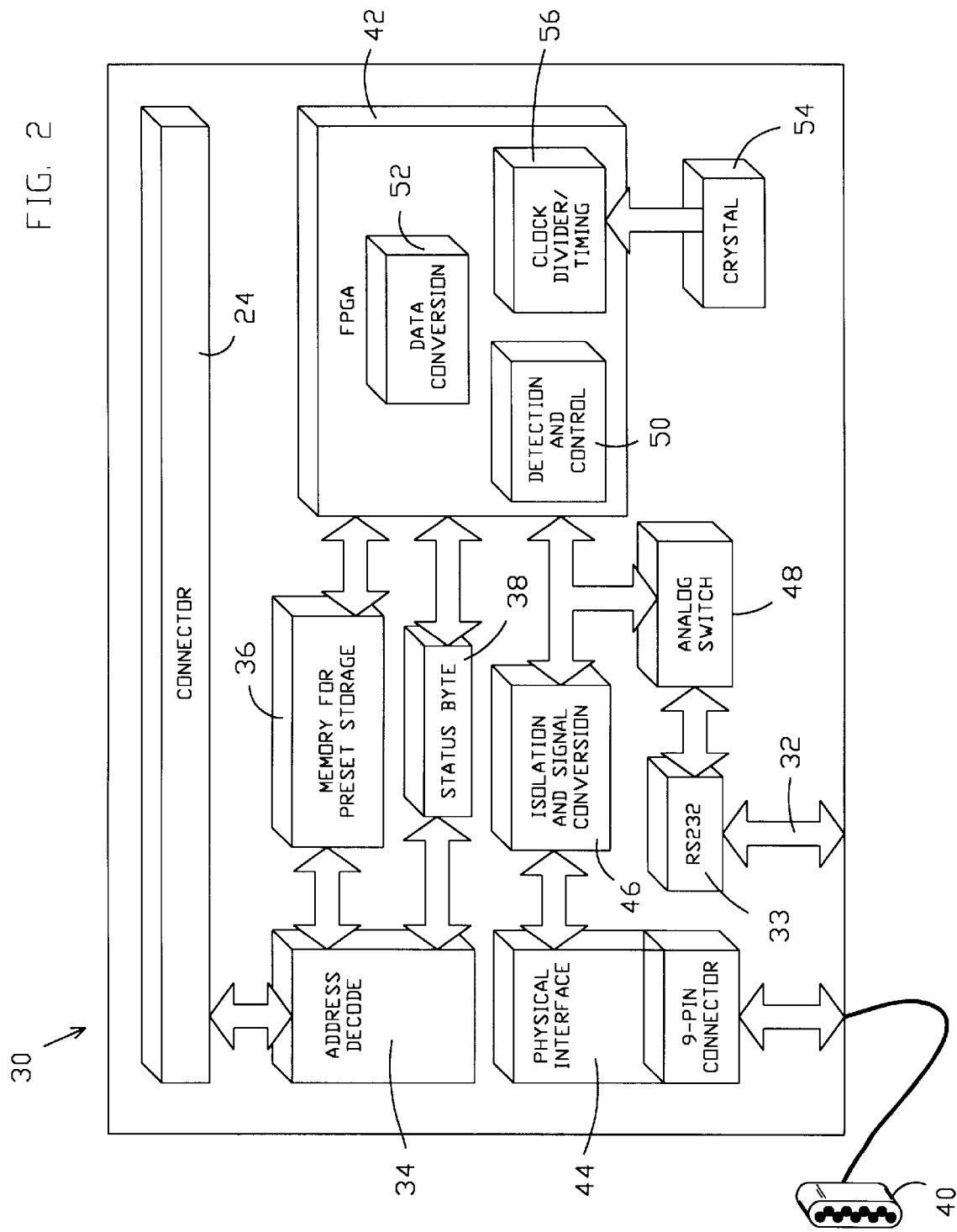
FIG. 2 is a block diagram of the LCP/PC host interface shown in FIG. 1.

Referring to FIG. 2, connector 40 is part of physical interface block 44 that, in the presently preferred embodiment, provides an external connection to the launch control panel or PC computer. Isolation and signal conversion block 46 is responsible for changing the incoming signal format to be recognizable. As discussed previously, address decode block 34 allows communications with countermeasure processor 26 through system bus 24. Analog switch 48 and connector 33 allow communication between a PC computer and countermeasure processor 26 through connector 40 and over bus 32. FPGA 42 provides status and control signals, and reads or writes via data conversion circuitry 52, the countermeasure preset data into non-volatile memory used for preset storage 36 and status byte 38. Detection and control circuitry 50 determines if launchable countermeasure device 10 is connected to either the launch control panel or a PC. If connected to the launch control panel, FPGA 42 performs functions such as reading presets, transmitting status, arming, and receiving the pre-launch command. When launchable countermeasure device 10 is connected to a PC, then detection and control circuitry controls analog switch 48 to direct communications protocol signals directly to a communication port of countermeasure processor 26 over bus 32. Crystal 54 and clock divider/timing block 56 provide timing controls for FPGA 42.

The launch control panel supplies 28-volt power to connector, or plug 40. A specialty cable is used to provide external 28-volt power when connected to a PC. Transformer coupling was previously used in prior art countermeasure devices. To maintain compatibility, transformer coupling was also used in isolation and signal conversion circuitry 46. Launch control panel communications provide a logical one signal using a five millisecond transmission of 10 kHz at plus and minus ten volt levels. A logical zero is represented by a five-millisecond period of no transmission. This format is used to transmit a sixty-four bit programming word. Data conversion and storage circuitry 52 converts this protocol to another data format and stores the contents. In order to communicate with countermeasure processor 26 and perform more sophisticated functions, a direct connection to countermeasure processor 26 is required. The RS232 format is preferably used with the computer port of countermeasure processor 26. The data format for RS232 serial communications includes a start bit, a selectable number of data bits, a selectable number of stop bits, a parity bit option, and the least significant bit (LSB) is transmitted first. The most common format and the one preferably used is a start bit, eight data bits, one stop bit, and no parity bit. Logic high is represented with minus twelve volts and a logic low is represented by plus twelve volts. The RS 422 signal uses a differential voltage to enable long transmission lengths and noise immunity. A logic high is represented by a differential voltage between the stow signal lines of at least 200 millivolts and a logic low is represented by a minus 200 millivolt difference signal. Commercial off the shelf converters are available-to convert RS232 and RS422 as desired. In the present scheme, the signals are applied to a transformer with sufficient impedance and voltage levels are controlled at the output to desired levels using zener diodes and pull up circuits. The inputs to the transformer are connected to correspond to the correct polarity taking into account the difference in polarity of the RS232 and RS422 signals. DC voltages are filtered out of the input of the transformer. The output of the isolation and signal conversion block 46 provides for common voltages that are then preferably inverted. If the signal format is from the launch control panel then it is accepted for operation by FPGA 42. If it is in RS232 or RS422 format then the same signal structure can be converted to RS232 and applied to the analog switch where it is accepted by countermeasure processor 26.

In summary of this process, isolation and signal conversion circuit 46 will accept the signal structures of the launch control panel, RS232, and RS422. All of these input signals are passed through isolation transformers and converted to logic levels. If the input signal is from the launch control panel, then it is kept at the logic level and received by detection and control circuitry 50 and the preset data is decoded and stored by data conversion block 52. If the input is either RS232 or RS422, the logic levels are then converted back to RS232levels and directed to countermeasure processor 26.

Figure 3:
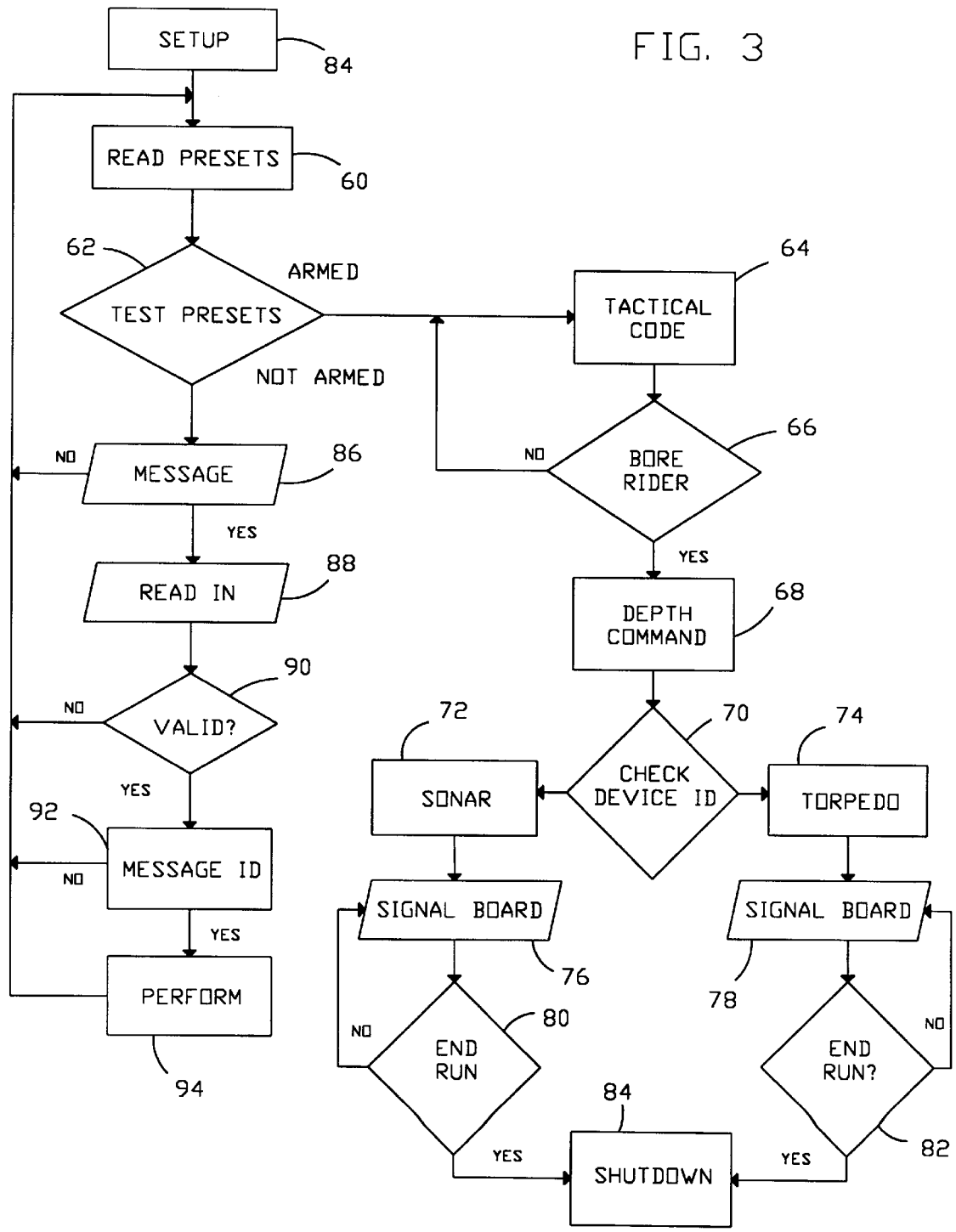
FIG. 3 is a flow diagram for operation of a launchable countermeasure device in accord with the present invention.

The software flow diagram of FIG. 3 for countermeasure processor 26 provides an overview of various aspects of operation launchable countermeasure device 10. LCP/PC host interface 30 reads/writes to preferably EEPROM memory when connected to the launch control panel as explained previously and will update preset information as specified by the launch control panel at 84. Countermeasure processor 26 reads presets as indicated at 60 and checks the presets as indicated at 62. If the status is unarmed, countermeasure processor 26 branches to step 86 for further processing. When status is armed, then tactical code is executed as indicated at 64. All initialization functions are completed within a specified time from launch. So long as bore rider status tested at 66 indicates that countermeasure device 10 has not yet been launched, then countermeasure processor 26 waits. Once the bore rider status is removed, then mission parameters, such as depth at 68, are established. A device ID is checked at 70 to determine whether sonar, at 72, or incoming torpedo countermeasure, at 74, parameters are established. Operational parameters are calculated for each channel according to the acoustic mode that is selected. These values are continuously transmitted to signal generator 19 as indicated at 76 and 78. Once the duration of the run time length has been reached as indicated at 80 and 82, then a shutdown operation is performed as indicated at 84.

If communications are made with a PC from countermeasure processor 26 as checked at 86, then the following format is used. Each message is read in at 88 and contains three eight bit control fields. The first byte is the start of header byte and is always AA hex. The start of header byte allows countermeasure processor 26 and the PC to identify the beginning of a new transmission as indicated at 86. The second byte of every message is the message ID type to allow the receiving processor to identify the message type and size for reading in the message. The last byte of every message is the checksum to validate each message transmission as indicated at 90. When a message has been received from the PC with a valid checksum, then it is tested for a valid message ID at 92. Once it has been determined that a valid message has been received, the requested operation is performed as indicated at 94. Operations such as system diagnostics, file uploads, and file downloads are commanded over RS232 serial bus 32 by the PC.

In summary, launchable countermeasure device 10 may be used to effect one or more of a plurality of different countermeasure techniques. Countermeasure device 10 may be controlled by either a standard launch control panel but may also be accessed by a PC using preferably an RS232 or RS422 format. In operation, the launch control panel downloads presets that are used to identify a particular countermeasure technique to be effected by data contained in the memory of the countermeasure processor 26. Launchable countermeasure device 10 is connected by a modular bus system and the various modules may be accordingly upgraded and new software downloaded for operation.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for effecting a plurality of countermeasure techniques using a launchable countermeasure device, comprising:

connecting an external computer to said launchable countermeasure device through an external connector outside of a hull of said launchable countermeasure device;

communicating with an internal countermeasure processor mounted within said hull of said launchable countermeasure device;

transferring from said external computer data related to said plurality of countermeasure techniques into a memory for use by said internal countermeasure processor;

disconnecting said external computer from said external connector;

connecting a launch control panel to said external connector;

selecting one or more of said plurality of countermeasure techniques using said launch control panel; and deploying said launchable countermeasure device to effect said selected one or more countermeasure techniques underwater.

2. The method of claim 1, further comprising:

reconnecting said external computer to said launchable countermeasure device; and communicating with said internal countermeasure processor to transfer upgraded data related to at least one of said plurality of countermeasure techniques into said memory.

3. The method of claim 1, further comprising using a logic gate array to determine whether said launch control panel or said external computer is connected to said external connector.

4. The method of claim 1, further comprising storing preset information in an interface.

5. The method of claim 4, further comprising using a logic gate array on said interface to detect arming of said launchable countermeasure device.

6. The method of claim 4, further comprising using said interface for communicating with said internal countermeasure processor selectively through a system bus when said launch control panel is connected to said external connector and through a communications connection when said external computer is connected to said external connector.

7. The method of claim 1, further comprising utilizing a commercial bus interface for communicating between said internal countermeasure processor and a hovering system and a signal generator system within said launchable countermeasure device.

8. The method of claim 5, further comprising execution of tactical code when arming is detected.

9. A launchable acoustic countermeasure device operable for deployment by a launch control panel and for programming by an external computer, said launch control panel and said external computer producing a respective launch control panel signal and external computer signals, said launch control panel signal and said external computer signals having a different signal format, said launchable acoustic countermeasure device comprising:

a watertight hull for said acoustic countermeasure device;

a data bus within said water tight hull;

a signal generator connected to said data bus for producing countermeasure acoustic signals through a transducer;

a hovering system connected to said data bus for controlling water depth and movement of said countermeasure device;

a bus controller for communicating with said signal generator and said hovering system through said data bus;

an external connector operable for use by said launch control panel or said computer;

an internal countermeasure processor with memory operable for producing a signal for said signal generator and said hovering system through said bus controller;

an interface for said external connector for controlling communication between said internal countermeasure processor and at least one of said launch control panel and said external computer; and a detection circuit within said interface operable to determine whether said external connector is connected to one of said launch control panel and said external computer.

10. The launchable acoustic countermeasure device of claim 9, further comprising an electronics module for physically supporting said bus controller, said internal countermeasure processor, and said interface, said electronics module including an electronics module bus for electrically connecting said bus controller, said internal countermeasure processor, and said interface.

11. The launchable acoustic countermeasure of claim 9, further comprising a communications connection between said interface and said internal countermeasure processor, said interface operating to transfer said external computer signal over said connection to said internal countermeasure processor when said detection circuitry determines said external detector is connected to said external computer.

12. The launchable acoustic countermeasure of claim 11, further comprising an analog switch in said interface for transferring said external computer signals to said connection.

13. The launchable acoustic countermeasure device of claim 9, further comprising memory for preset storage on said interface, said interface operating to read in presets to said preset storage or read back presets from said preset storage.

14. The launchable acoustic countermeasure device of claim 9, further comprising isolation and signal conversion circuitry on said interface operable for accepting at least one computer signal format from said external computer and a different signal format from said launch control panel.

15. The launchable acoustic countermeasure device of claim 14, wherein said isolation and signal conversion circuitry on said interface is operable to accept computer signal formats including RS232 signal format and RS422 signal format.

16. A method for effecting a plurality countermeasure techniques using a launchable countermeasure device, comprising the steps of:

connecting an external device to said launchable countermeasure device;

providing a mode selection signal from said connected external device to an internal countermeasure processing system within said launchable countermeasure device, said mode selection signal modes including a PC mode indicating that said connected external device is a general purpose computer and a launch control panel mode indicating that said connected external device is a launch control panel;

upon selection of said PC mode:
  receiving data from said connected external device at said launchable countermeasure device; and
  modifying operational code data in said internal countermeasure processing system with said received data; and upon selection of said launch control panel mode:
  receiving at least one countermeasure command from said connected external device at said launchable countermeasure device; and
  activating said internal countermeasure processing system to effect at least one preprogrammed countermeasure technique associated with said received countermeasure command.

17. The method of claim 16, wherein said one or more countermeasure techniques include sonar countermeasure techniques and incoming threat countermeasure techniques.

18. The method of claim 16 wherein said step of modifying operational code data comprises the step of installing a countermeasure technique program.

19. The method of claim 16, further comprising reading back presets when operated in said launch control panel mode.

20. The method of claim 16, further comprising performing diagnostics when operated in said PC mode.

* * * * *